(Model.)

A. D. KILBORN & W. F. SMITH.
CLEANING ASH PANS OF LOCOMOTIVE ENGINES.

No. 267,543. Patented Nov. 14, 1882.

WITNESSES:
C. Neveux
C. Sedgwick

INVENTOR:
A. D. Kilborn
W. F. Smith
BY Munn & Co
ATTORNEYS.

UNITED STATES PATENT OFFICE.

ALDEN D. KILBORN AND WILLIAM F. SMITH, OF TUCSON, ARIZONA TERRITORY.

CLEANING ASH-PANS OF LOCOMOTIVE-ENGINES.

SPECIFICATION forming part of Letters Patent No. 267,543, dated November 14, 1882.

Application filed August 11, 1882. (Model.)

*To all whom it may concern:*

Be it known that we, ALDEN D. KILBORN and WILLIAM F. SMITH, both of Tucson, in the county of Pima and Territory of Arizona, have invented a new and useful Improvement in Cleaning Ash-Pans of Locomotive-Engines, of which the following is a full, clear, and exact description.

The object of the invention is to force the cinders out of an ash-pan in a locomotive-engine by blowing water through it, as hereinafter fully described.

Reference is to be had to the accompanying drawings, forming a part of this specification, in which similar letters of reference indicate corresponding parts in both the figures.

Figure 1:
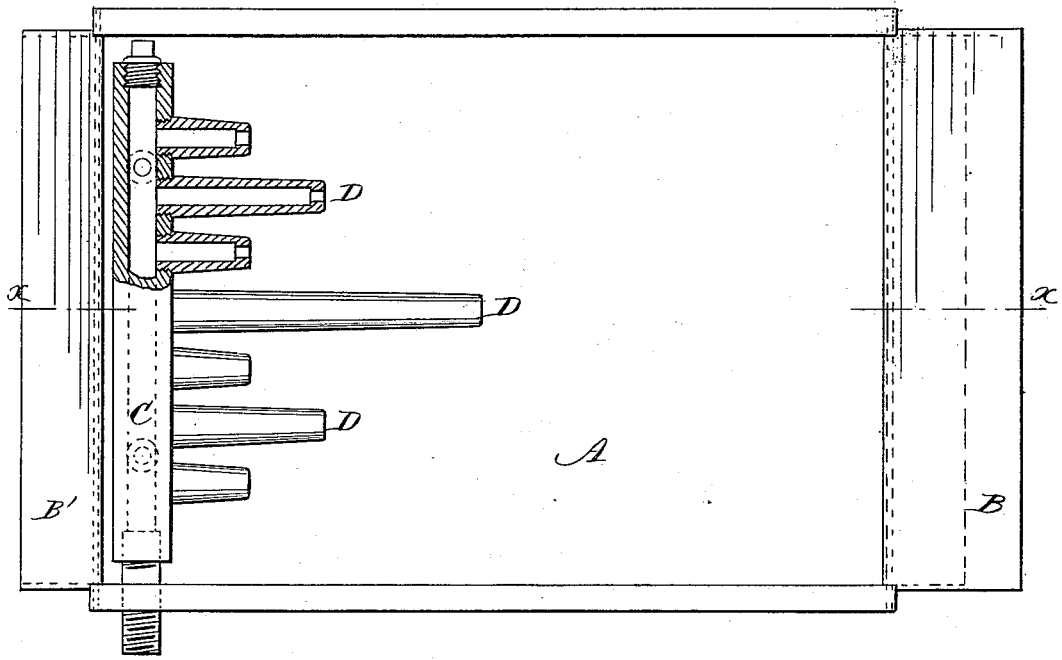
Figure 2:
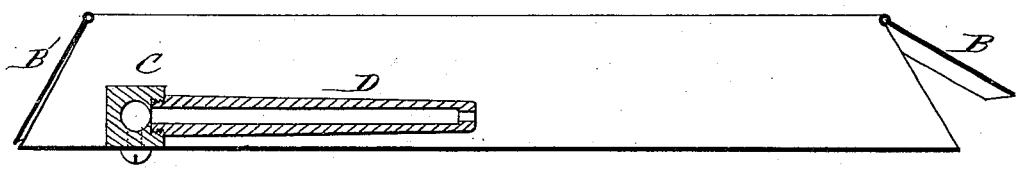

Figure 1 represents a partly broken top view of a locomotive-engine ash-pan, constructed and provided with devices for putting our invention into practice, and Fig. 2 a vertical longitudinal section of the same on the line $x\,x$ of Fig. 1.

A indicates the ash-pan, which is made with a pendent or hinged rear end, B, as well as a similarly-attached front end, B'.

Arranged within the front portion of the ash-pan, in proximity to its bottom, and disposed crosswise of the pan, is a blower or distributer constructed to provide for a discharge of water through the pan from front to rear, or from end to end, to blow or wash out the accumulated ash and cinders in the pan through the pendent or opening and closing end B. This blower it is proposed to construct of a hollow cross-bar, casting, or tube, C, arranged to extend across the front end portion of the ash-pan and perforated on its forward side at different points in its length, to provide for the discharge of the water, which is preferably done through pipes D D, inserted within the perforations in said hollow cross-bar, and directed to point toward the opening end B of the pan. These discharge-pipes, which may be screwed into the cross-bar, we prefer to make of different lengths, to distribute the water in a series of channels or streams, one in advance of the other, whereby the pan is more easily swept of its cinders by the water. The cross-bar C is connected at its one end by a pipe with the water-space of the boiler of the engine, subject to the control of a stop-cock, for opening and closing such connection, and for regulating the supply of water to and through the blower or distributer. By simply opening the cock to discharge water under pressure from the boiler to and through the blower or distributer the ash-pan is very effectually and rapidly cleared of cinder and ash, any sparks or burning particles extinguished, and dust rising from the mass laid. Such method of clearing the ash-pan may be put into effect both when the engine is running and when at rest, and all objectionable accumulation of cinders in the pan thereby be avoided, as well as a vast amount of labor be saved the fireman.

The invention may, if desired, be applied to the ash-pans of other engines besides locomotives.

We are aware that it is not broadly new to place a device for ejecting water in an ash-pan; but What we do claim as new is—

A distributer for cleaning locomotive ash-pans with water, consisting of the hollow cross-bar C, provided with a front row of straight ejecting pipes or nozzles, D, made of unequal length, to throw the water in a series of streams which strike the bottom, one in advance of another, whereby the cinders are more uniformly acted upon and the pan more thoroughly cleaned, as described.

ALDEN D. KILBORN.
WILLIAM F. SMITH.

Witnesses:
 FERDINAND K. MILLER,
 R. D. FERGUSON.